United States Patent [19]

Brinkmann et al.

[11] 3,865,791

[45] Feb. 11, 1975

[54] CERTAIN ENAMINE COMPOUNDS AND METHODS FOR MAKING AND USING THE SAME

[76] Inventors: Bernd Brinkmann, Werne, Muensterfort; Eugen Griebsch, Steinstrasse 22, Unna, both of Germany

[22] Filed: Apr. 3, 1972

[21] Appl. No.: 240,762

[30] Foreign Application Priority Data

Apr. 6, 1971  Germany............................ 2116882

[52] U.S. Cl................ 260/77.5 CH, 260/77.5 AQ, 260/290 R, 260/293 R, 260/293 A, 260/294.9, 260/566 R, 260/577
[51] Int. Cl....................... C08g 22/00, C08g 22/08
[58] Field of Search ............................ 260/77.5 CH

[56] References Cited
FOREIGN PATENTS OR APPLICATIONS
1,064,841   4/1967   Great Britain .............. 260/77.5 CH

*Primary Examiner*—Ronald W. Griffin
*Attorney, Agent, or Firm*—Curtis, Morris & Safford

[57] ABSTRACT

Certain polyenamines, enamines having an aldimine or ketimine group, and enamines having an hydroxy group, prepared by reacting an aliphatic aldehyde or cycloaliphatic ketone with, respectively, amines having two or more secondary amino groups, amines having both primary and secondary amino groups, and secondary amines having hydroxy groups.

Prepolymers prepared by reacting a polyisocyanate and an hydroxy-enamine.

Stable storable mixtures comprising an polyenamine, aldimine-enamine or ketimine-enamine, or a prepolymer as described, in combination with a polyisocyanate. In the presence of water or atmospheric moisture the mixtures harden. They can be used as lacquers, casting and patching resins, and for coatings and laminates.

4 Claims, No Drawings

CERTAIN ENAMINE COMPOUNDS AND METHODS FOR MAKING AND USING THE SAME

The present invention relates to certain enamine compounds, to methods of making the same, and to the reaction products of such enamine compounds with polyisocyanates.

Primary and secondary amines generally react with isocyanates very vigorously so that a controlled direct reaction of these materials is, in most cases, either impossible or very difficult.

It is known in the art to react isocyanates with moisture-sensitive amine derivatives, namely aldimines and ketimines, which themselves either do not react, or only react very slowly, with isocyanates, but which regenerate the free amines under the influence of moisture.

Polyaldimines and polyketimines have already been described in British Pat. publication No. 1,064,841, as has their use in mixtures with polyisocyanates. In the presence of moisture, polymers are formed from these mixtures by the reaction of primary polyamines, which are released from the aldimines or ketimines by hydrolysis, with the polyisocyanate with the formation of urea and biuret groups. However, in most cases, the storage stability of the aforementioned mixtures is unsatisfactory.

According to one feature of the present invention, novel poly-enamines are prepared by the reaction of certain secondary amines and certain aldehydes and ketones. These compounds can be used for the preparation of polymers containing urea groups.

Thus, novel di-enamines of the present invention have the formula

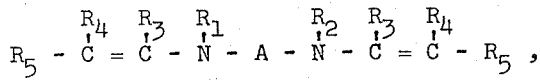

wherein A is:
aa. a divalent linear or branched hydrocarbon groups having 4 to 36 carbon atoms;
ab. a divalent polyether chain of the formula

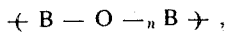

wherein B is $-CH_2CH_2-$,

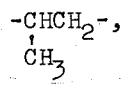

$-(CH_2)_4-$, or a divalent cycloaliphatic or aromatic hydrocarbon group optionally substituted with one or more alkyl groups and having altogether up to 12 carbon atoms, and wherein $n$ is an integer from 1 to about 1000; or
ac. a divalent cyclopentyl or cyclohexyl group, optionally substituted with one or more alkyl groups and having altogether up to 12 carbon atoms; or
ad. a divalent aromatic group optionally substituted with one or more alkyl groups and having altogether up to 12 carbon atoms. One or more hydrogen atoms on radical A may be substituted by hydroxy groups.

In the formula, $R_1$ and $R_2$ taken alone are:
ba. a univalent linear (i.e. alkyl unsubstituted) or branched (i.e. alkyl substituted) aliphatic, cycloaliphatic, or aromatic group having 1 to 12 carbon atoms;
bb. a divalent ethylene group forming a heterocyclic ring with group A; or
bc. a cyanoalkyl group.

$R_1$ and $R_2$ taken together are:
bd. a divalent ethylene group, optionally substituted by an hydroxy group or by one or more alkyl groups, and in case $R_1$ and $R_2$ form such a divalent ethylene group, then A is an ethylene group, optionally substituted with one or more alkyl groups.

Further, $R_3$, $R_4$, and $R_5$ are such that:
ca. $R_3$ is hydrogen and $R_4$ and $R_5$, which may be the same or different, are hydrogen, methyl, or ethyl; or
cb. $R_5$ is hydrogen and $R_3$ and $R_4$ together form a divalent hydrocarbon radical, $R_7$, which is a trimethylene or tetramethylene group, optionally substituted with one or more alkyl groups and having altogether up to 8 carbon atoms.

The di-enamines according to the present invention can be prepared by reacting a secondary diamine of the formula

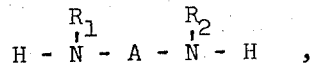

wherein A, $R_1$, and $R_2$ have their earlier meaning, with
a. an aliphatic aldehyde of the formula

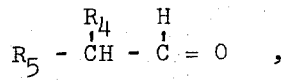

wherein $R_4$ and $R_5$ are the same or different and are hydrogen, methyl, or ethyl; or with
b. a cycloaliphatic ketone of the formula

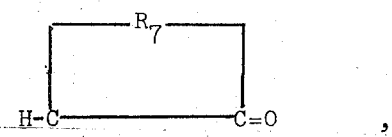

wherein $R_7$ has its earlier defined meaning. The reaction may proceed with the addition of heat, with cooling, or at room temperature, and may take place in or without an inert solvent. The reagents are reacted in stoichiometric amounts or, preferably, with the cheaper carbonyl reactant in stoichiometric excess. The water of reaction and any excess carbonyl compound are removed.

Water can be removed using dehydrating agents such as calcium oxide, sodium sulfate, or the so-called "molecular sieves". Most conveniently it is removed by azeotropic distillation using an organic solvent, or the excess carbonyl compound, as the entraining agent.

Acids may optionally be used in small quantity to catalyze the reaction. Although mineral acids may be employed, organic acids such as formic, acetic, or p-toluene sulfonic acids are preferred. Acid anion exchange resins can also be used as catalysts.

Typically, a secondary diamine or polyamine is combined with an excess of the carbonyl component for reaction and, after the addition of a suitable solvent such as toluene or benzene, the mixture is heated in a water separator under an inert atmosphere, such as of nitrogen, until water separation is complete. In certain cases, the carbonyl compound itself can serve as an entraining agent. Thus, secondary amines can be reacted with a reactive aldehyde such as isobutyraldehyde, using the latter as an entraining agent, at temperatures from about 70°C. – 100°C. (The boiling point of isobutyraldehyde is about 64°C.) With less reactive reagents, such as the ketones, higher-boiling entraining agents such as benzene, toluene, xylene, or other solvents inert to amines and forming azeotropes with water, can be employed.

Distillation of the polyenamine product is not strictly necessary. The crude product can be directly employed after removal of excess carbonyl component and solvent.

Aliphatic aldehydes and cyclic ketones are particularly suitable as the carbonyl component. Examples of aldehydes and ketones which can be used to advantage in the preparation of polyenamines according to the invention are: acetaldehyde, propionaldehyde, n-butyraldehyde, isobutyraldehyde, diethyl acetaldehyde, cyclopentanone, trimethyl cyclopentanone, cyclohexanone, trimethyl cyclohexanone, and other substituted cyclohexanones and cyclopentanones.

The less reactive aliphatic ketones give less good yields.

As examples of secondary amines which can be reacted with the aforementioned aldehydes or ketones can be named:

a. a secondary diamine of the formula

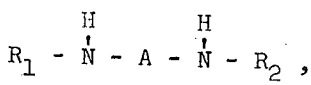

wherein $R_1$ and $R_2$ are methyl, ethyl, n-propyl, isopropyl, n-butyl, sec-butyl, isobutyl, cyclopentyl, cyclohexyl, or cyanoethyl and A is a divalent alkyl, cycloalkyl, aryl, or polyether radical;

b. a cyclic diamine of the type

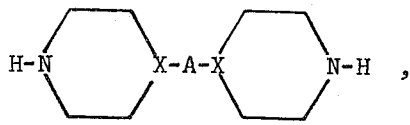

wherein X = —CH— or —N— and A has the meaning given directly above, but can also be absent if X is —CH—; or c. N-unsubstituted piperazine.

In another aspect of the present invention, novel compounds containing at least one enamine group and at least one ketimine and/or aldimine groups are prepared by reacting a compound having at least one secondary amino group and at least one primary amino group, such as N-aminoethyl-piperazine; 3-(3-aminopropyl)-2,3-dimethyl-piperidine; N-(3-aminopropyl)-piperazine; diethylene triamine; dipropylene triamine; dihexamethylene triamine; triethylene tetramine; tetraethylene pentamine; dicyanoethyl-tetrapropylene-pentamine; or dicyanoethyl-dipropylene triamine, with a. an aliphatic aldehyde of the formula

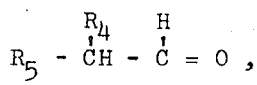

e.g. iso-butyraldehyde, or with
b. a cycloaliphatic ketone of the general formula

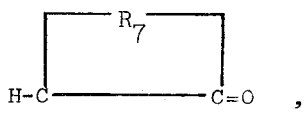

wherein $R_4$, $R_5$, and $R_7$ have their earlier meanings. As for the earlier-described reaction, these reagents also combine with an optional acid catalyst; optionally with the addition or removal of heat; and with or without a solvent. The water of reaction formed and excess carbonyl compound are removed from the reaction system as before.

In a similar fashion and under similar conditions, an aldehyde or ketone of the formulas given above is reacted with a compound having at least one secondary amino group and at least one aliphatic hydroxy group per molecule, i.e. N-(2-hydroxyethyl)-piperazine or N-(2-hydroxypropyl)-piperazine, to form a compound having both enamine and hydroxy groups.

In a still further aspect of the invention, a monoenamine having at least one free hydroxy or amino group is reacted with an equivalent amount of a polyisocyanate to form a novel prepolymer. The latter can be combined with further polyisocyanate according to the present invention.

Namely, one or more of the several enamine compounds described above is admixed with an equivalent amount of at least one organic polyisocyanate, which may be "capped", to form a novel, water-activatable, storage-stable mixture according to the invention. In the presence of water, these mixtures form poly-urea compounds, suitably while the reaction mass is being shaped. Thus, the mixtures are particularly useful for the preparation of lacquers, casting and patching resins, and for forming coatings and laminates. For application, the mixtures are a. combined with water and applied in the desired manner or b. applied in the desired way and then subjected to the influence of water, steam, or atmospheric moisture. Amounts of water less than are equivalent to the enamine content are suitable for effecting hardening.

Water-hardenable compositions are also obtained if a polyisocyanate is reacted with one-half an equivalent of an hydroxy-enamine to form a product in which the molecules have both a terminal isocyanate and a terminal enamine group.

As dienamines for use in the water-activatable mixtures described above, the reaction products of 3,3,5-trimethylcyclohexanone with secondary diamines of the type (b) and (c) above have proved particularly advantageous. The products are readily miscible with isocyanates.

As examples of organic polyisocyanates which can be reacted with enamines according to the invention are: aromatic polyisocyanates such as 2,4- and 2,6-toluene diisocyanate, 4,4'-diisocyanato-diphenylmethane, or 1,5-naphthalene diisocyanate; capped aromatic polyisocyanates, for example diisocyanato toluene capped with phenol, or a phenol-capped triisocyanate reaction product of trimethylolpropane with diisocyanatotoluene; aliphatic diisocyanates, such as hexamethylene diisocyanate, trimethylhexamethylene diisocyanate, dimeryl-diisocyanate (dimeryl = the radical of a dimerized fatty acid); cycloaliphatic diisocyanates such as dicyclohexyl-methane diisocyanate or isophorone-diisocyanate (i.e. 1-isocyanato-3-isocyanatomethyl-3,5,5-trimethylcyclohexane); triisocyanates containing biuret groups; the reaction products of polyols, for example low molecular weight aliphatic polyols or polybutadiene diols, with polyisocyanates; and prepolymeric isocyanates which are prepared by reaction of an excess of diisocyanate with polyesters or polyethers.

If required, the isocyanates, particularly the aromatic isocyanates, are employed in their capped form. Phenols, such as phenol and nonylphenol, and malonic acid esters are suitable for capping.

When mixtures of polyenamines and polyisocyanates are reacted with water, reaction slowly sets in, although further working up of the material is possible. The rate of hydrolysis of the enamine component depends on the kind of carbonyl component and on the secondary polyamine. Polyenamines which are derived from cyclic ketones hydrolyze more rapidly than those which are derived from aldehydes. Further, the rate of hydrolysis can often be increased considerably by the addition of acid, in a reversal of the enamine synthesis.

A better understanding of the present invention and of its many advantages will be had by referring to the following specific Examples, given by way of illustration. Examples 1 – 12 show the preparation of various enamines, while Examples 13 – 23 show the formation of polymers from enamines and polyisocyanates.

In the Examples all parts are parts by weight.

EXAMPLE 1

5.96 parts of 4,4'-dipiperidylpropane are combined with 8.18 parts of isobutyraldehyde and heated with reflux in a water separator. After 4 hours, half of the calculated water of reaction has separated. After 18 hours, the entire amount has separated. Excess aldehyde is removed and the residue is distilled in vacuum. The product is a bright clear liquid, b.p. = 170°C./0.4 mm Hg, which on standing gradually solidifies.

| Analysis (Percent by Weight) | Calculated for Di-Enamine | Found |
|---|---|---|
| C | 79.3 | 79.8 |
| H | 11.9 | 12.1 |
| N | 8.8 | 8.5 |

EXAMPLE 2

20 parts of N,N'-diisobutyl-2,2,4(2,4,4)-trimethyl-hexamethylene-diamine are heated in a water separator for 24 hours with 21.84 parts of isobutyraldehyde. After drawing off the aldehyde, the product is distilled in vacuum.
B.p. = 104 – 105°C./0.01 mm Hg; $n_D^{26}$ = 1.4608.

| Analysis (Percent by Weight) | Calculated for Di-Enamine | Found |
|---|---|---|
| C | 79.5 | 74.6 |
| H | 13.3 | 13.0 |
| N | 7.2 | 7.9 |

EXAMPLE 3

20 parts of N,N'-diisobutyl-1-amino-3-aminomethyl-3,5,5-trimethyl-cyclohexane are treated with 21.2 parts of isobutyraldehyde as in Example 2.

B.p. = 115°C./0.05 mm Hg; $n_D^{26}$ = 1.4700.

| Analysis (Percent by Weight) | Calculated for Di-Enamine | Found |
|---|---|---|
| C | 80.0 | 79.2 |
| H | 12.8 | 13.1 |
| N | 7.2 | 8.0 |

EXAMPLE 4 a. 50 parts of N-(2-hydroxyethyl)-piperazine are heated for 15 hours in a water separator with 27.7 parts of isobutyraldehyde and 30 parts of toluene. Thereafter, excess aldehyde and toluene are removed and the residue is distilled in vacuum.
B.p. = 112°C./2.5 mm Hg

| Analysis (Percent by Weight) | Calculated for -Enamine | Found |
|---|---|---|
| C | 65.3 | 63.7 |
| H | 10.8 | 11.1 |
| N | 15.2 | 15.6 | b. 20 parts of a triisocyanate prepared from a branched polypropylene glycol and from isophorone diisocyanate (1-isocyanato-3-isocyanatomethyl-3,5,5-trimethyl-cyclohexane) are reacted with 1.84 parts of the enamine of 4(a) containing an hydroxy group by heating for one hour at 80°C.

EXAMPLE 5

A mixture of 43 parts of piperazine, 210 parts of 3,3,5-trimethyl-cyclohexanone, and 200 parts of toluene are combined with a catalytic amount of formic acid and boiled in a water separator until the separation of water is complete.

Toluene and excess ketone are removed and the residue is distilled in vacuum.
B.p. = 150°C./0.01 mm Hg
M.p. = 87°C.

| Analysis (Percent by Weight) | Calculated for Di-Enamine | Found |
|---|---|---|
| C | 80.0 | 80.1 |
| H | 11.5 | 11.6 |
| N | 8.5 | 8.5 |

EXAMPLE 6

A mixture of 105 parts of 4,4'-dipiperidylpropane, 210 parts of 3,3,5-trimethyl-cyclohexanone, and 200 parts of toluene is treated as in Example 5.
B.p. = 200°C./0.01 mm Hg; $n_D^{25}$ = 1.5163

| Analysis (Percent by Weight) | Calculated for Di-Enamine | Found |
|---|---|---|
| C | 81.9 | 81.8 |
| H | 11.9 | 12.0 |
| N | 6.2 | 6.1 |

EXAMPLE 7

20 parts of N-aminoethyl-piperazine are combined with 44.4 parts of isobutyraldehyde.

The reaction mixture is heated in a water separator until no more water separates. After drawing off the excess aldehyde, the residue is distilled in vacuum.
B.p. = 86°C./0.05 mm Hg

| Analysis (Percent by Weight) | Calculated for -Enamino-aldimine | Found |
| --- | --- | --- |
| C | 70.9 | 70.05 |
| H | 11.3 | 11.68 |
| N | 17.8 | 17.7 |

The formula of the enamino-aldimine obtained is:

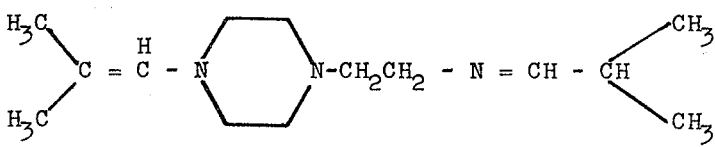

EXAMPLE 8

A mixture of 30 parts of 2,5-dimethylpiperazine and 75.8 parts of isobutyraldehyde is heated for 12 hours in a water separator.

After drawing off the isobutyraldehyde, the residue is distilled and a dienamine of the formula

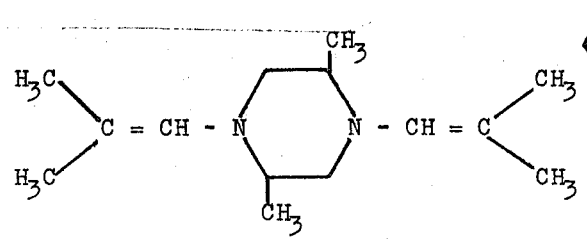

is obtained.
B.p. = 65°C./0.2 mm Hg

| Analysis (Percent by Weight) | Calculated for Di-Enamine | Found |
| --- | --- | --- |
| C | 75.7 | 74.2 |
| H | 11.7 | 11.7 |
| N | 12.6 | 12.2 |

EXAMPLE 9

A mixture of 60 parts of N-(β-hydroxyethyl)-piperazine, 45 parts of cyclohexanone, and 45 parts of toluene is combined with a catalytic amount of formic acid and heated in a water separator until the reaction is concluded (about 30 hours). After removal of the toluene, the residue is distilled and an enamine of the formula

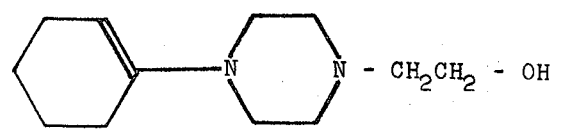

is obtained.
B.p. = 120°C./0.01 mm Hg.

| Analysis (Percent by Weight) | Calculated for Enamine | Found |
| --- | --- | --- |
| C | 68.6 | 67.9 |
| H | 10.5 | 10.7 |
| N | 13.3 | 13.8 |

EXAMPLE 10

A mixture of 50 parts of N-(2-aminoethyl)-piperazine and 110 parts of cyclohexanone is combined with 200 ml of benzene and heated under reflux in a water separator until the calculated amount of water (about 140 g) has separated. Then the excess solvent is carefully distilled off in vacuum. The remaining product is sufficiently pure to be employed directly. The infrared spectrum shows a ketimine band and an enamine band at 1660 cm$^{-1}$ and 1645 cm$^{-1}$ respectively, and shows no carbonyl or amine bands.

The formula of the enamino ketimine formed is

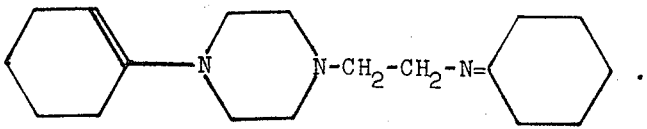

EXAMPLE 11

21.15 parts of dihexamethylene triamine are combined with 40.0 parts of cyclohexanone and 200 ml of toluene. After the addition of 0.1 ml of formic acid, the mixture is boiled under reflux in a water separator until separation of water is complete. The toluene and excess cyclohexanone are distilled off in vacuum. The highly viscous liquid remaining is sufficiently pure to be used for the hardening of polyurethane prepolymers by humidity.

The infrared spectrum showed ketimine and enamine bands at 1660 cm$^{-1}$ and 1645 cm$^{-1}$, but no carbonyl or amine bands.

The formula of the reaction product formed is

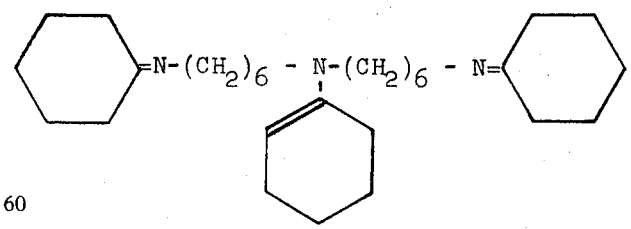

EXAMPLE 12

A mixture of 19 parts of tetraethylene pentamine and 55 parts of isobutyraldehyde is refluxed in a water separator until the reaction is complete. Then the excess aldehyde is removed under a weak vacuum. The infrared spectrum of the viscous fluid product shows an enamine or aldimine band at 1670 cm$^{-1}$, but shows no carbonyl or amine bands.

The formula of the reaction product formed is

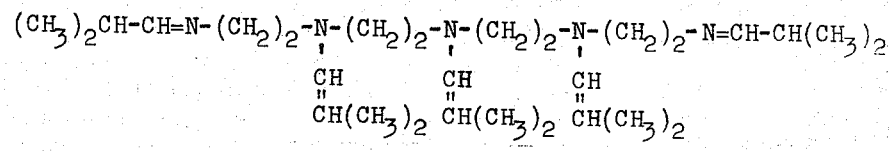

EXAMPLE 13

10 parts of the di-enamine formed in Example 1 from 4,4'-dipiperidylpropane and isobutyraldehyde are combined with 19.6 parts by weight of a phenol-capped triisocyanate, formed from diisocyanatotoluene and trimethylolpropane, in ethylene glycol acetate to form a 50 percent solution. The mixture can be stored with the exclusion of moisture for 16 weeks without an increase in viscosity. The solution, when spread as a thin layer, hardens in 20 minutes in air (at 60 percent relative humidity) to form a clear tack-free film.

EXAMPLE 14

10 parts of the di-enamine formed in Example 1 from 4,4'-dipiperidylpropane and isobutyraldehyde are mixed with 6.9 parts of isophorone diisocyanate in ethylene glycol acetate to form a 50 percent solution. The mixture can be stored with exclusion of moisture for 12 weeks without increase in viscosity. The solution, applied to a surface as a thin layer, hardens in 90 minutes in air (at 60 percent relative humidity) to form a clear tack-free film.

EXAMPLE 15

A 50 percent solution of 10 parts of the di-enamine formed in Example 1 from 4,4'-dipiperidyl propane and isobutyraldehyde and 6.55 parts of trimethylhexamethylene diisocyanate in ethylene glycol acetate can be stored for over 12 weeks without an increase in viscosity. The solution, applied to a surface as a thin layer, hardens in 50 minutes in air (at 60 percent relative humidity) to form a clear tack-free film.

EXAMPLE 16

10 parts of the di-enamine formed in Example 1 from 4,4'-dipiperidyl propane and isobutyraldehyde are mixed with 29 parts of the triisocyanate prepared from isophorone diisocyanate and trimethylolpropane in ethylene glycol acetate to form a 50 percent solution. The solution can be stored for over 12 weeks without increase in viscosity. The applied solution hardens in 30 minutes in air to a clear tack-free film.

EXAMPLE 17

89 parts of a polyisocyanate prepared from a slightly branched polypropylene glycol (MW = ca. 2000) and isophorone diisocyanate are mixed with 10 parts of the di-enamine formed in Example 1 from 4,4'-dipiperidylpropane and isobutyraldehyde. The mixture can be stored for over 12 weeks without an increase in viscosity. A casting made from the material hardens, after the stirring in of an equivalent amount of water, within 12 hours to form an elastic product.

EXAMPLE 18

A mono-enamine is prepared from N-hydroxyethyl piperazine and isobutyraldehyde and reacted with the polyisocyanate of Example 17 to form a polyenamine. 10 parts of this polyenamine are mixed with 2.8 parts of the triisocyanate formed from isophorone diisocyanate and trimethylolpropane in ethylene glycol acetate to form a 50 percent solution. The solution can be stored for over three weeks without an increase in viscosity. The applied solution hardens in air (at 60 percent relative humidity) to form an elastic film in about 100 minutes.

EXAMPLE 19

A linear polyester is reacted with isophorone diisocyanate to form a prepolymeric isocyanate (NCO = 8.3 percent by weight).

10.5 parts of this polyisocyanate are combined with 3.2 parts of a di-enamine formed from dipiperidyl propane and isobutyraldehyde. After the addition of some methyl isobutylketone and an amount of water equivalent to the amount of enamine, a catalytic amount of formic acid is stirred in. The reaction is initiated by mild heating. The mixture is thoroughly hardened after 30 minutes to form an elastic product.

EXAMPLE 20

100 parts of a branched polyether having a molecular weight of 4700, obtained by the reaction of trimethylolpropane with propylene oxide, are reacted with 11.1 parts of 2,4-diisocyanatotoluene at 70°C.

A reaction product having an isocyanate content of 2.5 percent by weight is obtained.

A stoichiometric mixture of this product with the reaction product of N,N'-diisobutyl-trimethylhexamethylene diamine and isobutyraldehyde (cf. Example 2) can be stored with exclusion of atmospheric moisture for over 5 months without gelation. A sample hardens under the influence of atmospheric moisture within a few hours to form an elastic product.

EXAMPLE 21

100 parts of a branched polyether having a molecular weight of 4700, obtained by the reaction of trimethylolpropane with propylene oxide, are reacted with 11.1 parts of 2,4-toluene diisocyanate at 70°C.

A reaction product having an isocyanate content of 2.5 percent is obtained.

After the addition of 13.6 parts of nonylphenol and a catalytic amount of dibutyl tin dilaurate, the mixture is heated for another 2½ hours at 70°C. A liquid polyurethane having an isocyanate content of less than 0.2 percent is obtained.

A stoichiometric mixture of this product with the reaction product of 4,4'-dipiperidylpropane and 3,3,5-trimethylcyclohexanone (cf. Example 6) can be stored with exclusion of atmospheric moisture for over 5 months without gelation. A sample hardens in air within 30 hours to form an elastic product.

EXAMPLE 22

100 parts of a di-functional polypropylene glycol having an average molecular weight of 2000 are combined with 17.4 parts by weight of 1,4-toluene diisocyanate. The reaction mixture is heated for two hours with stirring at 70°C. and for a further 2.5 hours at 80°C. A reaction product having an isocyanate content of 3.65 percent is obtained. After the addition of 16 g of nonyl phenol and 0.1 percent of dibutyl tin dilaurate, the mixture is stirred for an additional 2.5 hours at 70°C. The reaction product now has an isocyanate content of less than 0.2 percent.

100 parts of this capped prepolymer are mixed with 6.6 parts of the reaction product of tetraethylene pentamine and isobutyraldehyde shown in Example 12. A sample of this mixture hardens to an elastic tack-free product when exposed to atmospheric moisture.

EXAMPLE 23

100 parts by weight of a branched polyether having a molecular weight of 4700, obtained by the reaction of trimethylolpropane with propylene oxide, are reacted with 11.1 parts of 2,4-toluene diisocyanate at 70°C. A reaction product having an isocyanate content of 2.5 percent is obtained.

50 parts of this product are stirred for 10 hours at 25° – 30°C. with (a) 6.05 parts of 1-(2-hydroxyethyl)-4-cyclohexenyl-piperazine (cf. Example 9).

A further 50 parts of the product were heated for 2.5 hours at 70°C. with (b) 6.8 parts of nonyl phenol and 0.1 percent of dibutyl tin dilaurate.

A blend of (a) and (b) produces a product which is storage-stable over several months. However, when exposed to atmospheric moisture a sample of the product hardens in several days to form an elastic transparent product.

The following Tables summarize the advantages of the present invention. The legend for the following Tables is as follows:

a. Primary Amine
  $A_4$ = Hexamethylene diamine
  $A_5$ = Polyether amine (MW = 1426)
  $A_6$ = 1,8-p-menthane-diamine b. Secondary Amine
  $A_7$ = 4,4′-dipiperidyl-propane
  $A_8$ = Hydroxyethyl piperazine
  $A_9$ = N,N′-di-isobutyl-isophorone diamine
  $A_{10}$ = N,N′-di-isobutyl-trimethyl-hexamethylene-diamine
  $A_{11}$ = Piperazine
  $A_{12}$ = N-(2-aminoethyl)-piperazine
  $A_{13}$ = 2,5-dimethylpiperazine c. Polyisocyanate
  $C_2$ = Hexamethylene diisocyanate
  $C_3$ = Toluene diisocyanate
  $C_4$ = Isophorone diisocyanate
  $C_5$ = Trimethyl hexamethylene diisocyanate
  $C_6$ = Dimeryl diisocyanate (dimeryl = radical of a dimerized fatty acid)

d. Polyester, Polyhydroxy compounds
  $P_2$ = Oxypropylated hexanetriol
  $P_3$ = Oxypropylated sorbitol
  $P_4$ = 70:30 mixture of trimethylolpropane and diethylene glycol
  $P_5$ = Condensation product of trimethylolpropane and butyleneglycol
  $P_6$ = Poly-(hexanetriol-/1,3-butylenegylcol-adipate)
  $P_7$ = Poly-(ethylene-/propylene-adipate)
  $P_8$ = Trimethylolpropane
  $P_9$ = Polypropylene glycol
  $P_{10}$ = Polyester of adipic acid/trimethylhexanediol (1:1.7) (MW = 555)

In the Table, the notation (C) indicates that the isocyanate compound employed is capped.

TABLE I

Combinations of Poly-enamines and Polyisocyanates According to the Invention

| Example No. | Polyisocyanate Comprises | Poly-enamine formed between Isobutyraldehyde and | Tack-Free after (Minutes) | Storage Time for the Mixture without Gelation |
|---|---|---|---|---|
| 1,13 | $C_3 + P_8$ (C) | $A_7$ | 20 | >16 weeks |
| 1,14 | $C_4$ | $A_7$ | 90 | >12 months |
| 1,15 | $C_5$ | $A_7$ | 50 | >7 months |
| 1,16 | $C_4 + P_8$ | $A_7$ | 30 | >12 weeks |
| 1 | $C_2$ + Water | $A_7$ | | 40 hours |
| 1,17 | $C_4 + P_9$ | $A_7$ | Casting with water 12 hours | >16 weeks |
| 4 | $C_4 + P_9$ | $A_8$ ($C_4 + P_9$) | 100 | >7 weeks |
| 3 | $C_4$ | $A_9$ | 80 | >10 months |
| 3 | $C_5$ | $A_9$ | 90 | >10 months |
| 3 | $C_6$ | $A_9$ | 120 | >8 weeks |
| 3 | $C_4 + P_8$ | | 40 | >8 weeks |
| 3 | $C_3 + P_8$ (C) | $A_9$ | 120 | >10 months |
| 3 | $C_3$ | $A_9$ | | >9 months |
| 2 | $C_4$ | $A_{10}$ | 60 | >10 months |
| 2 | $C_5$ | $A_{10}$ | 90 | >10 months |
| 2 | $C_6$ | $A_{10}$ | 120 | >8 weeks |
| 2 | $C_4 + P_8$ | $A_{10}$ | 40 | >8 weeks |
| 2 | $C_3 + P_8$ (C) | $A_{10}$ | 120 | >10 months |
| 2 | $C_3$ | $A_{10}$ | | >9 months |
| 1 | $C_4 + P_9$ | $A_7$ | | >9 months |
| 5 | $C_4 + P_9$ | $A_{11}$ | | >4 weeks |
| 7 | $C_4 + P_9$ | $A_{12}$ | | >9 months |
| 7 | $C_4$ | $A_{12}$ | | >9 months |
| 7 | $C_4 + P_8$ | $A_{12}$ | | >9 months |
| 7 | $C_5$ | $A_{12}$ | | >9 months |
| 7 | $C_6$ | $A_{12}$ | | >9 months |
| 4 | $C_3 + P_8$ (C) | $A_8$ + ($C_4 + P_9$) | | >12 weeks |
| 4 | $C_6$ | $A_8$ + ($C_4 + P_9$) | | >10 months |
| 18, 4 | $C_4 + P_8$ | $A_8$ + ($C_4 + P_9$) | | >3 weeks |
| 20, 2 | $P_9 + C_3$ | $A_{10}$ | | >18 weeks |
| 8 | $P_9 + C_3$ | $A_{13}$ | | >12 weeks |

COMPARISON TABLE

Combinations of Polyimines and Isocyanates According to British Patent Publication 1,064,841

| Polyisocyanate Comprises | Polyimine formed from Butyraldehyde and | Tack-Free after (Minutes) | Maximum Storage Time (Gelation Time) |
| --- | --- | --- | --- |
| C₂ + P₂ | A₄ | 20 | 13 days |
| C₂ + Water | A₄ | 30 | 7 days |
| C₂ + P₃ | A₄ | 15 | 16 hours |
| C₃ + P₄ | A₄ | 15 | 18 hours |
| C₃ + P₅ | A₄ | 30 | 4 hours |
| C₂ + P₆ | A₄ | 35 | 32 days |
| C₃ + P₇ | A₄ | 30 | 2 days |
| C₂ + Water | A₅ | 60 | 2 days |
| C₃ + P₅ | A₆ | 30 | 11 hours |
| C₂ + P₆ | A₆ | 35 | 12 weeks |

TABLE II

Castings According to the Invention

| Polyisocyanate Comprises | Poly-enamine formed from Isobutyraldehyde/Methyl-isobutyl-ketone mixture and | Catalyst | Thoroughly Hardened in |
| --- | --- | --- | --- |
| C₄ + P₉ | A₇ * | — | 12 hours |
| C₄ + P₉ | A₇ * | 0.1 N H₂SO₄ | 90 minutes (mild warming) |
| C₄ + P₁₀ | A₇ * | 0.1 N H₂SO₄ | 5 to 10 minutes (warming) |

* The mixtures were hardened with addition of an amount of water equivalent to the amount of enamine.

—$(CH_2)_4$—, a divalent cycloaliphatic or aromatic hydrocarbon group, or such a group having at least one alkyl substituent, said group having a total of up to 12 carbon atoms, and wherein n is an integer from 1 to about 1000;

ac. a divalent cyclopentyl or cyclohexyl group, or such a group having at least one alkyl substituent, said group having a total of up to 12 carbon atoms; or ad. a divalent aromatic hydrocarbon group, or such a group having at least one alkyl substituent, said group having a total of up to 12 carbon atoms;

ae. a divalent group as defined in (aa) – (ad) wherein one or more hydrogen atoms is replaced by hydroxy; and wherein $R_1$ and $R_2$, taken alone, are each ba. a univalent linear or branched aliphatic group, or an unsubstituted or alkyl substituted cycloaliphatic or aromatic group, said group having 1 to 12 carbon atoms; or bb. a divalent ethylene group forming a closed heterocyclic ring with group A;

bc. a cyanoethyl group; and wherein $R_1$ and $R_2$, taken together, are bd. a divalent ethylene group or such a group substituted with an hydroxy group or at least one alkyl group, in which case A is an ethylene group or such a group substituted with at least one alkyl group; and wherein ca. $R_3$ is hydrogen and $R_4$ and $R_5$, which may be the same or different, are hydrogen, methyl, or ethyl; or cb. $R_5$ is hydrogen and $R_3$ and $R_4$ together are a divalent trimethylene or tetramethylene group, or such a group having at least one alkyl substituent, said group having a total of up to eight carbon atoms.

2. The method of making a polyurea polymer which comprises combining a stable mixture as in claim 1 with water.

3. The method as in claim 2 wherein water is added to said stable mixture.

4. The method as in claim 2 wherein a body of said stable mixture is exposed to water or water vapor.

* * * * *

What is claimed is:

1. A stable mixture which forms a polyurea polymer in the presence of water, said mixture comprising
   A. at least one polyisocyanate; and
   B. a moisture-sensitive compound hydrolyzing in the presence of water to form an amine reactable with said polyisocyanate, said compound being
   1. a compound containing at least one enamine group and at least one ketimine or aldimine group;
   2. a prepolymeric reaction product of a polyisocyanate and an enamine having at least one hydroxy ar amino group; or
   3. a dienamine of the formula

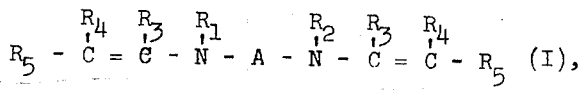

wherein A is
   aa. a divalent linear or branched aliphatic hydrocarbon group having 4 – 36 carbon atoms;
   ab. a divalent polyether chain of the formula $+B - O +_n B -$ , wherein B is —$CH_2CH_2$—,

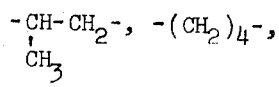

UNITED STATES PATENT OFFICE
CERTIFICATE OF CORRECTION

Patent No. 3,865,791     Dated February 11, 1975

Inventor(s) Brinkmann et al.

It is certified that error appears in the above-identified patent and that said Letters Patent are hereby corrected as shown below:

In the Heading: After Item "[76]" and before Item "[22]"

insert -- [73] Assignee: Schering AG.

Berlin and Bergkamen, Germany --.

Signed and sealed this 15th day of April 1975.

(SEAL)
Attest:

RUTH C. MASON
Attesting Officer

C. MARSHALL DANN
Commissioner of Patents
and Trademarks